April 29, 1952  F. C. VALENTA  2,594,829
FOWL SCALDING APPARATUS
Filed March 19, 1947  2 SHEETS—SHEET 1
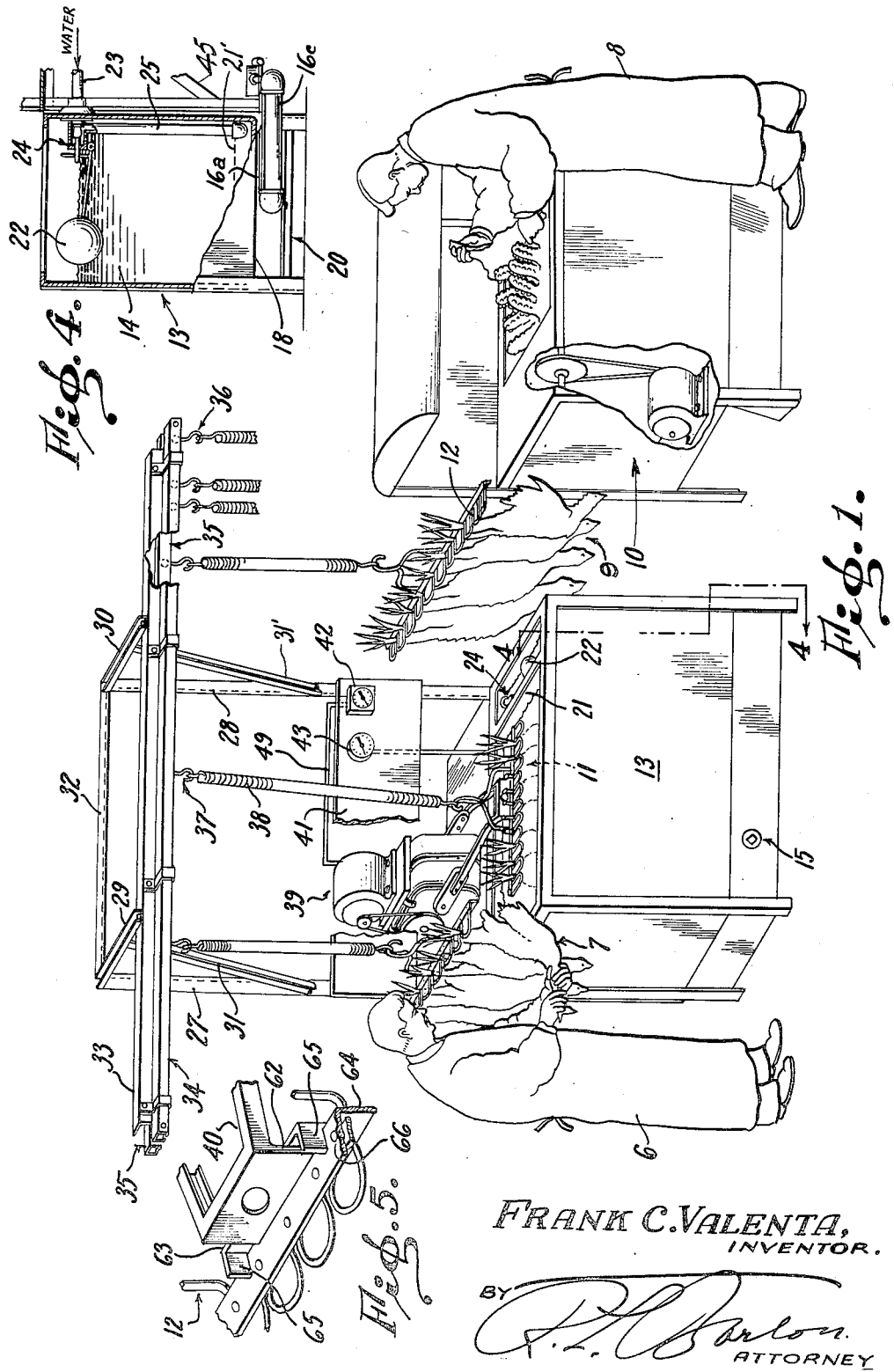
Frank C. Valenta,
INVENTOR.
BY
ATTORNEY April 29, 1952 F. C. VALENTA 2,594,829
FOWL SCALDING APPARATUS
Filed March 19, 1947 2 SHEETS—SHEET 2

FRANK C. VALENTA,
INVENTOR
ATTORNEY

Patented Apr. 29, 1952

2,594,829

UNITED STATES PATENT OFFICE 2,594,829

FOWL SCALDING APPARATUS

Frank C. Valenta, Burbank, Calif.

Application March 19, 1947, Serial No. 735,646

2 Claims. (Cl. 17—11.2)

This invention relates to an apparatus for automatically dunking fowls in scalding water.

Notwithstanding the great variety of ways for scalding fowls preparatory to de-feathering them, it may be said with assurance that there never has been produced heretofore any device which exceeded the efficiency, except for lack of speed, of scalding a fowl by dunking it up and down by hand in a pot. Although that method has been handed down as a good example to follow for family use, yet the principle has never been broadened to the extent where such a method is used for rapidly scalding poultry en masse mechanically from a production standpoint.

It is among the important objects of the invention to provide a new and novel device which operates according to the above principle by providing a machine which will scald a plurality of fowls at one time mechanically by the up and down movement which I term "dunking" and at the expiration of a predetermined number of mechanically timed dunkings will automatically stop, thereupon the fowls are immediately elevated to a non-dunking position by retractile means cooperatively related to the part of the machine responsible for the dunking operation. This is an important feature since the poultry will never be under-scalded or over-scalded, as the case might be in machines not employing controlled timing, or in some electrical machines where the disrupting of an electrical circuit might leave the poultry to overheat and thereby render it less favorable for use or probably unsaleable.

Another object of the invention is to improve upon the skillful handling of poultry between the killer, scalder and picker by coordinating the work so that the task ordinarily assigned to three persons can now be accomplished by two.

Among further and more specific objects are: To provide an improved overhead conveyor to serve the threefold purpose of supporting shackled fowls while they are being killed, scalded and de-feathered; to provide a novel combination of dunker head, controlled timer, overhead conveyor, chicken shackle support, and means yieldable to the action of gravity between the shackle support and conveyor to perform the automatic dunking operation when the shackle is connected to the dunker; to provide improved means for increasing the scalding rate of birds per hour; and to, in general, simplify mechanism, reduce costs; and through the medium of the improved mechanism greatly add to the comfort of the individuals performing this class of work.

Other objects, advantages and features of invention will hereinafter appear.

Referring to the accompanying drawings wherein is shown a preferred embodiment of the invention as now reduced to practice, Fig. 1 is a perspective view of the device as used in connection with a picker and having portions broken away to disclose underlying structure while other portions are removed so as not to obscure parts it is desired to present to view.

Fig. 4 is a section taken on zig-zag line 4—4 of Fig. 1.

Fig. 5 is an enlarged fragmental perspective view showing how the dunker mechanism is detachably applied to the shackle support.

Figures 2, 3:
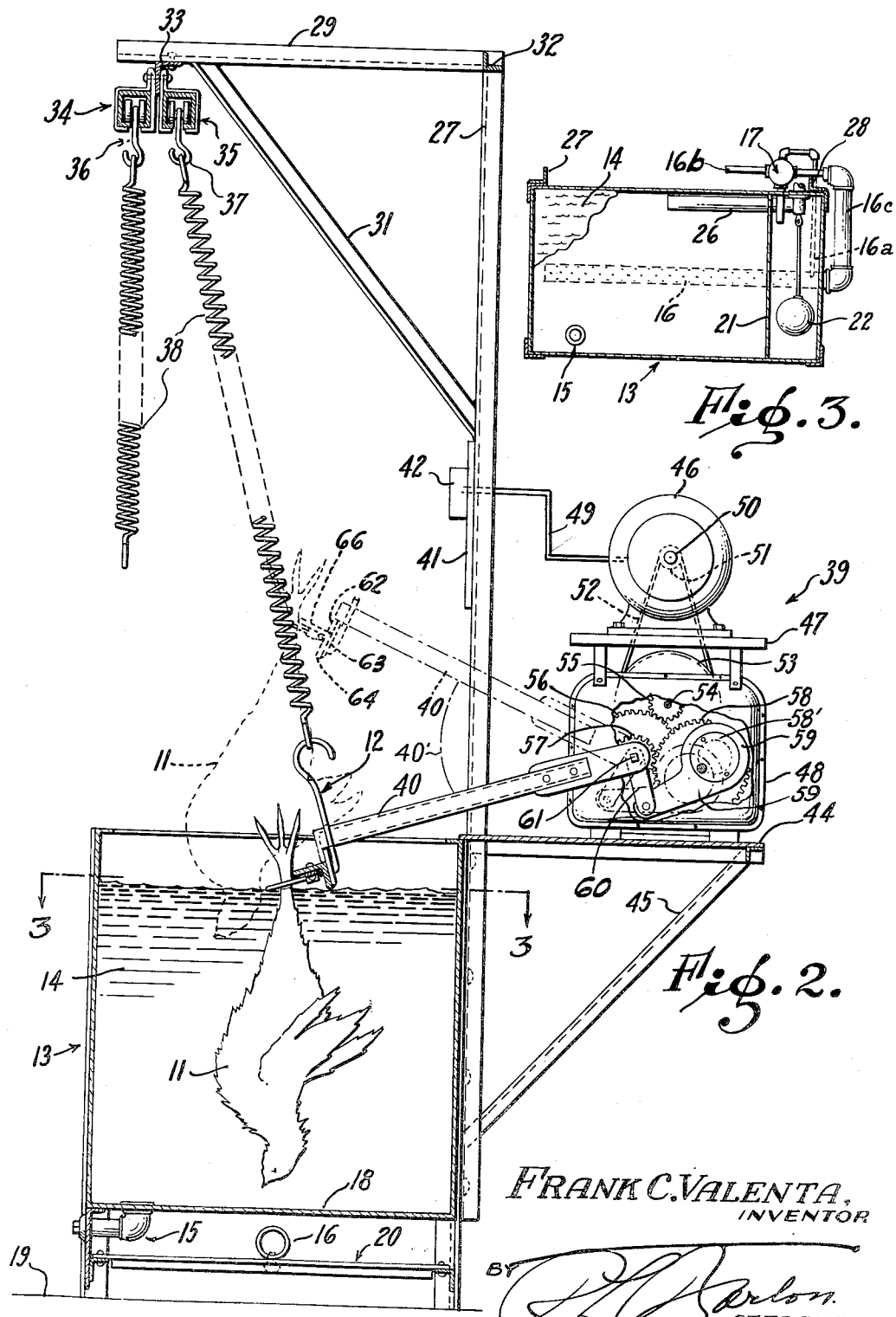
Fig. 2 is a transverse section taken through the device on a somewhat increased scale showing the dunker mechanism in one position wherein the fowl is submerged, and in dotted lines in another position in which the fowl is not submerged, portions of the dunker head being broken away to disclose operating mechanism within the head.
Fig. 3 is a section taken on line 3—3 of Fig. 2, on a reduced scale, with parts broken away.

Referring in detail to the drawings, in Fig. 1 is shown a practical embodiment of the invention illustrating how the killing, dunking and machine picking of the fowl is accomplished by two persons.

6 indicates the man killing the fowls 7, 8 indicates the man de-feathering the scalded fowls 9 through the medium of the machine 10, and 11 indicates a shackle of fowls being subjected to the dunking operation, the timing of the killing, dunking and de-feathering being such that the person who does the killing also operates simultaneously the dunking mechanism so that between the two workmen the cycle of killing, dunking and picking is a continuous one.

The fowls are passed on a shackle 12 to the killer 6. The method of killing shackled birds eliminates further handling after machine picking by the machine 10.

The apparatus used in conjunction with the dunking operation will now be described. The numeral 13 designates a tank containing a body of water 14 and provided with a drain 15, said water being heated by the gas burner 16 to a correct scalding temperature, such temperature being accurately maintained through the medium of the thermostatic control 17. A pilot 16a is operatively connected with the gas burner 16 and thermostat 17, and the gas to the thermostat flows through the main conduit 16b and from the thermostat the gas flows through the conduit 16c to said burner.

The bottom 18 of the tank is located superjacent the floor 19 in order to mount the gas burner on the framework 20 thereunderneath. The tank 13 is provided with a partition 21 under which the water flows freely. Said partition extends from the top of the tank to a point 21' adjacent the tank floor 18 so that the agitation of the water during the vigorous dunking operation of the fowls will not disturb the quiescency of the float 22. The float 22 maintains a constant level of the water in the tank delivered from the main water supply line 23 through the medium of the valve mechanism 24 (see Fig. 4). Water passes from the valve mechanism 24 into the vertically extending pipe 25 which terminates in a short horizontal run 26 (see Fig. 3), located in a vertically spaced relation to the floor of the tank.

In order to eliminate the tiresome task of lifting and carrying the poultry from the killing place to the scalder and later to the picker, I have provided an overhead conveyor attached to the tank. This construction embodies the use of the upright members 27 and 28 and the laterally extending arms 29 and 30, which overhang the tank in an upwardly spaced relation to its top. Said arms are reinforced by the diagonal braces 31 and 31' and cross bracing 32 attached to the rear ends of the arms 29 and 30.

A cross member 33 also spans the space between the arms 29 and 30 at their front ends, such member in turn furnishing a support whereto affix the pairs of overhead rails 34 and 35 which support the roller carriers 36 and 37. From said carriers are suspended the extensible springs 38, said springs in turn supporting the shackles 12. When said shackles are connected to the dunking mechanism 39 as shown in Fig. 2 it is the function of the springs to automatically lift the fowls from the full line position therein shown to the dotted line position, at the expiration of the time allotted for the dunking operation, even though perchance the time set would end when the dunker yoke 40 is at the upper limit of its travel as dottedly shown in said figure, or at some point between the two extreme positions.

The stability of the framing for the overhead carrier is further enhanced through the medium of the plate 41 serving as a panel whereon to mount the automatic timer clock 42 and the auxiliary thermometer 43.

The dunking mechanism 39 is mounted on a platform 44 located rearwardly of and on a level with the top of the tank so that during the operation of said mechanism the free forward extremities of the dunker yoke 40 will describe a limited arc 40' as shown in Fig. 2 above the central portion of the tank. The platform is braced by structural supports 45 located at each end thereof.

The means for rocking the yoke up and down comprises the electric motor 46 mounted on the platform 47 superjacent the gear case 48, said motor being connected to the electric time control 42 by means 49 so that when the time control is set for a predetermined interval the mechanism 39 will rock the yoke up and down during that interval only and then stop.

On the outer end of shaft 50 of motor 46 is fixed a pulley wheel 51 driving, through a drive belt 52, a pulley wheel 53 fixed on a shaft 54 journalled on the gear case. A spur pinion 55 fixed on shaft 54 meshes with and drives a spar gear 56 rotatably mounted in the gear case and with which is driven a pinion 57. The latter meshes with and drives a gear 58 rotatably mounted in the gear case and driving an eccentric disk 58'. On the periphery of eccentric disk 58' is mounted the eccentric strap 59' of a pitman 59 pivotably connected to one end of a crank arm 60. The opposite end of crank arm 60 is fixed to a rock shaft 61. Thus, the gear train and eccentric mechanism impart rocking movement to shaft 61 and to the arms of the dunker yoke fixed to outwardly projecting square end parts of the rock shaft.

The forward end of the yoke 40 is provided with a downwardly depending flange 62 (see Fig. 5), and the shackle 12 is provided with a plate 63 fastened to the back face of the vertical leg of the angle 64. Said plate is provided with inturned flanges 65 adapted to overlie the horizontal flanges 66 of the angle 64. The flange 62 of the yoke plays between the two inturned flanges 65 when the shackle is affixed to the yoke as best shown in Figs. 2 and 5. Tension in the spring is sufficient not only to keep the shackle and yoke engaged, but also to provide means whereby the yoke and shackle will be held in an elevated position for convenient removal of the fowl when the actuating mechanism is stopped.

Although it is believed the operation will be understandable in view of the foregoing disclosure, a short résumé will be added for the sake of clarity.

A group of the fowl is disposed adjacent the tank in a killing position on one of the shackles movably suspended from one of the parallel tracks and successively moved to scalding and then to discharging position, as shown at Figure 1. The unloaded shackle may then be returned to initial killing position without interference with shackles maintaining fowl in scalding or other positions by movement along another track.

After the killer completes the killing of a group of shackled fowls the spring carried load is placed above the tank whereupon the spring 38 is stretched downwardly until the plate 63 and flange 62 are engaged as shown in Fig. 5. Then the controlled timing is set for the definite dunking period and the motor is started. The fowls are moved up and down in the scalding water until the motor stops whereupon the spring tension lifts the fowls to non-dunking position by reversing the mechanism in the dunker casing. The fowls are then advanced on the shackle to the position shown at 9 and the picker machine picks the fowls.

The partition in the tank maintains quiescency of the float so that a normal level of liquid is maintained therein. The thermostat maintains the constant temperature of the water in the tank by throttling the gas to the burner whenever it is necessary to add or subtract heat.

I claim:

1. In apparatus for treating fowls, a tank containing fluid for treating fowls preparatory to removing the feathers, a frame secured to and rising from said tank, a platform extending horizontally from the rear of the tank, an overhead track fixed horizontally to the frame above the tank, a fowl supporting hanger suspended from and movable along said track, and means mounted on said platform and operatively connected to said hanger for oscillatingly immersing fowls on said hanger in the fluid in the tank.

2. In apparatus as defined in claim 1 wherein said hanger comprises a resiliently extensible element.

FRANK C. VALENTA.

REFERENCES CITED

The following references are of record in the file of this patent:

UNITED STATES PATENTS

| Number | Name | Date |
|---|---|---|
| 1,637,096 | Allen | July 26, 1927 |
| 1,668,039 | Allen | May 1, 1928 |
| 1,960,048 | Bruce | May 22, 1934 |
| 1,977,542 | Bruce | Oct. 16, 1934 |
| 2,152,082 | Onorato et al. | Mar. 28, 1939 |
| 2,408,248 | Barber | Sept. 24, 1946 |
| 2,470,409 | Nassivera | May 17, 1949 |
| 2,479,395 | Mumper | Aug. 16, 1949 |